Sept. 9, 1958 J. C. SCHIRA, JR 2,851,519

MECHANICAL TO VIDEO TRANSDUCER FOR SUPERIMPOSING ADDITIONAL INFORMATION ON A TELEVISION SCENE

Filed Jan. 31, 1952

INVENTOR
John C. Schira, Jr.
BY Morris L. Rabkin
ATTORNEY 2,851,519

MECHANICAL TO VIDEO TRANSDUCER FOR SUPERIMPOSING ADDITIONAL INFORMATION ON A TELEVISION SCENE

John C. Schira, Jr., Collingswood, N. J., assignor, by mesne assignments, to the United States of America as represented by the Secretary of the Navy Application January 31, 1952, Serial No. 269,250

5 Claims. (Cl. 178—5.6)

Figures 1, 2, 3A, 3B, 4A, 4B:
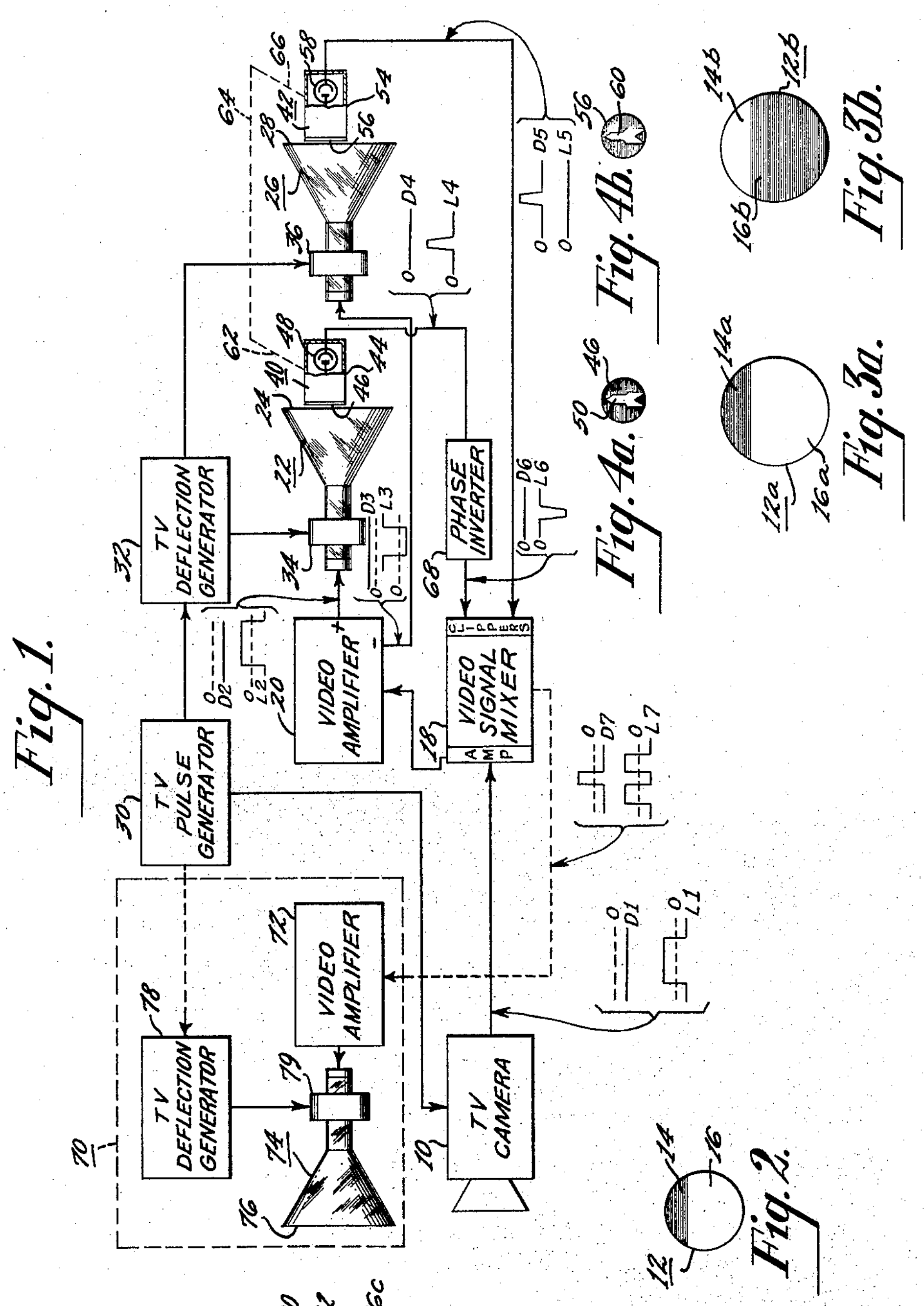

This invention relates to television systems generally. More particularly, the invention relates to an improved method of and means for transmitting a televised scene and visual information to be added thereto, whereby a television viewer will receive the televised scene with the added visual information superimposed thereon, and in contrast thereto, on the screen of his television receiver. Although not limited thereto, the method and arrangement of apparatus is particularly useful as a simple and inexpensive means for superimposing matter on a televised scene.

During the broadcast of certain television material, the broadcaster may desire to direct the attention of the television viewers to a certain portion of the televised scene by superimposing an arrow or some other visual information thereon. It has also become a practice for some broadcasters to superimpose matter over a televised scene in such a manner that both the televised scene and the matter are viewed at the same time, as a double exposure.

Many means have been proposed for adding visual information to televised material without interrupting the action of the television picture. In one proposed method, a metallic probe or pointer is held in contact with a selected portion on the glass face of a cathode-ray monitor tube on which a reconstituted picture of the televised scene appears. The pointer derives electrical impulses by means of capacitive coupling to the electron beam on the screen of the monitor tube. These electrical impulses are shaped to give them a desirable waveform and are combined with the video signals from the televised scene to be transmitted as a part thereof. Depending upon the polarity of the inserted electrical impulses, the received television picture will include either a bright spot or a dark spot, the position of which corresponds to the selected portion of the pointer on the face of the monitor tube. This method, however, has certain disadvantages. For instance, the metallic pointer must come in physical contact with the face of the monitor tube so that there is always a danger of breaking the tube. Also since a bright spot appearing over a bright area, or a dark spot appearing over a dark area, of the televised scene will be invisible, the polarity of the electrical impulses must be chosen properly. Since the televised scene is always changing, it is necessary to change manually the polarity of the electrical impulses frequently. If, however, the spot or other added visual information extends over a black and white area of the reconstituted picture on the monitor tube, only a portion of the added visual information will be visible clearly, depending on the chosen polarity of the electrical impulses. It is obvious, also, that this method does not provide a practical manner by which advertising matter, or extensive visual information, may be superimposed on a televised scene.

It is a common practice to superimpose matter over a televised scene by using one television camera to televise the scene and another television camera to televise the matter to be superimposed. The signals from both cameras are then combined and transmitted. In this method, too, some of the superimposed matter will be obscured if there is insufficient contrast between the televised scene and the superimposed matter. Furthermore, this method has another disadvantage in that it requires the use of more than one relatively expensive television camera.

It is, therefore, a general object of this invention to provide an improved method of and means for directing attention to selected portions of a televised scene.

It is another object of this invention to provide an improved television system of the above-described character by means of which a broadcaster may superimpose visual information on a constantly changing televised scene in such a manner that all parts of the visual information will appear in contrast to the televised scene.

Still another object of this invention is to provide an improved television system of the above-described character by means of which a broadcaster may superimpose visual information on a televised scene, and in proper visual contrast thereto, without the necessity of changing the polarity of the information impulses manually.

A further object of this invention is to provide an improved television system of the above-described character by means of which a broadcaster may add visual information to a televised scene easily, safely and economically.

In accordance with the invention, the foregoing and other related objects and advantages are attained in a television system wherein video signals from a televised scene are utilized as positive and negative signals to produce a positive picture on the screen of one cathode-ray tube and a negative picture on the screen of another cathode-ray tube. An indicator is placed adjacent corresponding portions of each screen, and normal thereto. The indicators are linked to each other mechanically and are adapted to move in parallel paths relative to each other so that, when one indicator is adjacent a particular portion of the positive picture, the other indicator will be adjacent a corresponding portion of the negative picture. Each indicator comprises a tubular housing having an opaque mask adjacent and parallel to the screen end and photosensitive means adjacent the other end. The masks are formed with similar light-transmitting apertures, in parallel alignment and orientation, and the photosensitive means produce electrical impulses synchronously with the movement of the cathode-ray beam as they sweep across the apertures. The electrical impulses derived from the positive picture are inverted in phase while those derived from the negative picture are utilized without inversion. The electrical impulses and the video signals are then combined and transmitted. The picture received by a television receiver will be the televised scene and the image of the light-transmitting apertures superimposed thereon. By this arrangement and method, the image of the light-transmitting apertures (i. e., the added visual information) will stand out in contrast to the televised scene.

Figure 5:
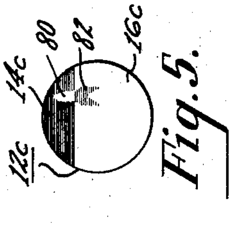

A more complete understanding of the invention can be had by reference to the following description of an illustrative embodiment thereof, when used in connection with the accompanying drawing, in which Fig. 1 is a schematic diagram of a television system in accordance with the present invention, Fig. 2 is a view representing a televised scene which may be transmitted by the system, Figs. 3*a* and 3*b* are positive and negative views, respectively, of the televised scene appearing on cathode-ray monitor tubes in the system, Figs. 4*a* and 4*b* are front elevational views of apertured masks used in the system, and Fig. 5 is a view representing the televised scene which may be received on a television receiver cathode-ray tube in accordance with the present invention.

Referring to Fig. 1, there is shown a television system comprising a television camera 10 of the type in common use for televising television programs. Let it be assumed that the scene upon which the camera 10 is focused is a scene 12 comprising a black or relatively dark portion 14, constituting roughly the upper third of the scene 12, as shown in Fig. 2. The remaining two-thirds of the scene 12 constitute a white, or relatively light, portion 16. The video signals derived from the televised scene 12 are fed to a video signal mixer 18, having clipper and amplifier circuits, for the purpose appearing hereinafter. From the amplifier circuit of the video signal mixer 18, the video signals are fed to a video amplifier 20 where they are amplified and converted into positive-going video signals and negative-going video signals. The positive-going video signals are fed to a cathode-ray monitor tube 22 in the usual manner so that a positive image or picture 12*a* will appear upon the face or screen 24 of the monitor tube 22, as shown in Fig. 3*a*. The picture 12*a* is similar to the televised scene 12 and comprises a dark portion 14*a* and a light portion 16*a* similar to the dark portion 14 and the light portion 16, respectively, of the scene 12. The negative-going signals from the video amplifier 20 are fed to a cathode-ray monitor tube 26 so that a negative image or picture 12*b* will appear on the face or screen 28 of the monitor tube 26, as shown in Fig. 3*b*. The negative image 12*b* comprises an upper light portion 14*b* and a lower dark portion 16*b* corresponding to the dark portion 14 and the light portion 16, respectively, of the scene 12. A television pulse generator 30 is connected to the camera 10 for the purpose of scanning the scene 12 in a manner well known in the art. The generator 30 is also connected to a television deflection generator 32 which, in turn, is connected to a deflection yoke 34, and a deflection yoke 36, of the monitor tubes 22, 26, respectively. By this arrangement, the cathode-ray beams of the monitor tubes 22, 26 sweep their respective screens synchronously with the scanning of the televised scene 12 by the camera 10. Although the same generator 30 is shown as being connected to the camera 10 and to the deflection generator 32 which, in turn, drives the deflection yokes 34, 36 of the monitor tubes 22, 26, it is obvious to those skilled in the art that one pulse generator may be used for the camera 10 and another for the deflection generator 32 as long as the screens 24, 28 of the monitor tubes 22, 26 are swept synchronously with the scanning operation of the camera 10 over the televised scene 12.

In accordance with the present invention, there is provided means to superimpose visual information on the reconstituted televised scene 12. To this end, an elongated indicator 40 is positioned in front of and normal to the screen 24 of the monitor tube 22, and a similar indicator 42 is likewise disposed in front of the screen 28 of the monitor tube 26. The indicator 40 comprises an elongated tubular housing 44 having a mask 46 of opaque material fixed, in any suitable manner, to an end thereof adjacent and parallel to the screen 24 of the monitor tube 22. Adjacent the other end of the housing 44 is a photosensitive device 48, such as a photoelectric cell.

If it is desired to use the indicator 40 as an indicating device to direct attention to a selected portion of the televised scene 12, the mask 46 may be formed with a light-transmitting aperture 50, in the form of an arrow, as shown in Fig. 4*a*. The indicator 42 is similar in construction to the indicator 40 and comprises a housing 54, a mask 56, and a photosensitive device or photoelectric cell 58. The mask 56 is formed with a light-transmitting aperture 60 similar in shape to the aperture 50 and in parallel alignment therewith. The indicator 40 is linked mechanically to the indicator 42 by a mechanical linkage represented by the dashed lines 62, 64 and 66 in such a manner that the indicators 40, 42 may be moved only in parallel paths relative to each other. The mechanical linkage 62, 64, 66 is also such that a movement or turning of the indicator 40 relative to a portion of the screen 24 of the monitor tube 22 will cause a corresponding movement or turning of the indicator 42 relative to a corresponding portion of the screen 28 of the monitor tube 26.

It will now be seen that, as the cathode-ray beams of the monitor tubes 22, 26 sweep across the apertures 50, 60, electrical impulses are generated in the photosensitive devices 48, 58 of varying magnitudes proportional to the varying intensities of the light from the cathode-ray beams. The electrical impulses from the photosensitive device 58 are fed to the video signal mixer 18 where they are combined with the video signals from the camera 10. The electrical impulses from the photosensitive device 48 are fed to a phase inverter 68 where their phase is inverted, or shifted 180°, and then fed to the video signal mixer 18 where they are also combined with the video signals from the camera 10. The video signal mixer 18 may comprise clipper circuits to accentuate the electrical impulses from the photosensitive devices 48, 58 for maximum contrast with the video signals from the camera 10.

The combined video signals comprising the video signals from the camera 10 and the electrical impulses from the photosensitive devices 48, 58 are transmitted and may be received in a television receiver 70, amplified by a video amplifier 72, and fed to a cathode-ray receiver tube 74 to produce a picture or image 12*c* on its screen 76. A deflection generator 78 drives a deflection yoke 79 synchronously with the scanning operation of the camera 10 over the scene 12.

The image or picture 12*c*, as shown in Fig. 5, is similar to the scene 12 except that it has superimposed upon it a combined image of the light-transmitting apertures 50, 60 in such a manner that a part 80 of the image of the apertures 50, 60 in the dark portion 14*c* is relatively light and a part 82 of the image of the light-transmitting apertures 50, 60 in the light portion 16*c* is relatively dark. The position of the superimposed parts 80, 82 with respect to the received picture 12*c* bears the same relationship as the positions of the light-transmitting apertures 50, 60 bear to the positive and negative scenes 12*a*, 12*b*, respectively. For example, if the light-transmitting apertures 50, 60 are in the upper, right-hand quadrant relative to the pictures 12*a* and 12*b*, respectively, the superimposed parts 80, 82 will be in the upper, right-hand quadrant relative to the received picture 12*c*.

The masks 46, 56 may be similar, photographic negatives, for example. It is readily apparent that the masks 46, 56 may contain any desired matter. This matter will represent the light-transmitting portions of the negative, the image of which may be superimposed on the television receiver screen 76 in the same manner as the image of the parts 80, 82 of the light-transmitting apertures 50, 60 were superimposed on the received scene 12*c*.

The waveforms D1 to D7 and L1 to L7, shown at the outputs of the components of the television system of Fig. 1, represent the transitions of a relatively dark video signal (D) from the dark portion 14 of the televised scene 12 and a relatively light video signal (L) from the light portion 16 of the televised scene 12, respectively. Thus, it may be seen how the waveform D1, from the camera 10, is mixed in the video signal mixer 18 with the waveform D5, from the photo-sensitive device 58, to form the waveform D7, whereby to provide the light part 80 in the dark portion 14*c* of the picture 12*c*. In a similar manner, it may be seen that the waveform L7 is the result of mixing the waveforms L1 and L6. The negative-going pip in the center of the waveform L7 provides the dark part 82 in the light portion 16*c* of the picture 12*c*.

There has been shown and described herein, in accordance with the objects of this invention, a means for adding visual information to a televised scene in a manner that will enable a television viewer to see the added visual information superimposed on the screen of a television receiver. The means for deriving electrical impulses representative of the visual information to be added are simple and economical in that they comprise a pair of photoelectric devices each of which is sensitive to the intensity of a cathode-ray beam sweeping across a light-transmitting portion of a mask in front of the photo-sensitive device. Since the visual information to be added to the scene is converted to electrical impulses derived from both a positive and negative picture of the televised scene, and the electrical impulses from the positive scene are inverted in phase, the information when superimposed on the television receiver will stand out in contrast to the televised scene. The method described provides a means for automatically contrasting the added visual information, under practically all conditions of normal operation, to the contrast existing in the scene itself. Another advantage of the method described herein is that the indicators need not touch the surface of the monitor tubes, as is necessary in capacitive pickup methods, and the danger of breaking the monitor tube is, therefore, obviated.

While only certain specific forms of the invention have been shown and described, it is obvious that many changes could be made without departing from the scope or spirit of the invention. Therefore, the foregoing is to be considered as illustrative and not in a limiting sense.

What is claimed is:

1. In a television system, a television camera for scanning a scene, means for deriving positive and negative video signals simultaneously from said camera, a first monitor tube and a second monitor tube each having a sceen and means for sweeping a cathode-ray beam over said screen synchronously with the scanning operation of said camera, means for applying said positive video signals to said first monitor tube for reconstituting a positive picture of said scene on its screen, means for applying said negative video signals to said second monitor tube for reconstituting a negative picture of said scene on its screen, an indicator in front of each said screen, each of said indicators comprising a tubular housing having a mask at one end thereof adjacent its associated screen, each mask being formed with parallel, aligned light-transmitting apertures, photosensitive means within each housing responsive to light from said reconstituted positive and negative pictures through said apertures for generating electrical impulses synchronously with the movement of and proportional to the intensity of said beams, means for inverting the phase of the generated electrical impulses responsive to the light from the reconstituted positive picture, and means for combining said video signals with the electrical impulses from said negative picture and said inverted electrical impulses.

2. A television system as defined in claim 1 characterized by the addition of means to move said indicators in parallel paths over selected, corresponding portions of said screens.

3. In a television system for superimposing visual information on a television scene, means for scanning a scene and deriving video signals therefrom, a first cathode-ray monitor tube having a first screen, a second cathode-ray monitor tube having a second screen, means for reconstituting a positive picture of said scene on said first screen and a negative picture of said scene on said second screen, a first indicator comprising a first tubular housing having a first end adjacent a first selected portion of said first screen, a first mask formed with first light-transmitting portions over said first end and parallel to said first screen, and a first photosensitive means within said first housing responsive to the intensities of light from said reconstituted positive picture through said first light-transmitting portions for generating first electrical impulses, a second indicator similar to said first indicator and comprising a second tubular housing having a second end adjacent a second selected portion of said second screen corresponding to said first selected portion of said first screen, a second mask formed with second light-transmitting portions in parallel alignment with said first light-transmitting portions over said second end and parallel to said second screen, and a second photosensitive means within said second housing responsive to the intensities of light from said reconstituted negative picture through said second light-transmitting portions for generating second electrical impulses, said first and second light-transmitting portions comprising said visual information, means for inverting the phase of said first electrical impulses, and means for mixing said video signals with said phase inverted electrical impulses and said second electrical impulses.

4. A television system as defined in claim 3 characterized by the addition of means to move said first and second indicators in parallel paths over corresponding selected portions of said first and second screens respectively.

5. A television system as defined in claim 3 wherein said first and second masks comprise similar photographic negatives.

References Cited in the file of this patent

UNITED STATES PATENTS

| | | |
|---|---|---|
| 2,047,533 | Von Ardenne | July 14, 1936 |
| 2,275,026 | Bedford | Mar. 3, 1942 |
| 2,369,783 | Homrighous | Feb. 20, 1945 |
| 2,487,641 | Denk | Nov. 8, 1949 |
| 2,613,263 | Hilburn | Oct. 7, 1952 |